(12) United States Patent
Kelly et al.

(10) Patent No.: US 7,895,596 B2
(45) Date of Patent: Feb. 22, 2011

(54) PROCESSOR ASSIGNMENT IN MULTI-PROCESSOR SYSTEMS

(75) Inventors: Mark Kelly, Birmingham, MI (US); Charles Edward Newman, Northbridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1562 days.

(21) Appl. No.: 11/224,849

(22) Filed: Sep. 13, 2005

(65) Prior Publication Data

US 2007/0061521 A1    Mar. 15, 2007

(51) Int. Cl.
    G06F 9/46    (2006.01)
(52) U.S. Cl. .......................................... 718/102
(58) Field of Classification Search .................. 718/102
    See application file for complete search history.

(56) References Cited

U.S. PATENT DOCUMENTS

| | | | | |
|---|---|---|---|---|
| 5,271,020 A * | 12/1993 | Marisetty | ..................... | 714/746 |
| 5,418,953 A * | 5/1995 | Hunt et al. | ................... | 718/102 |
| 5,448,732 A * | 9/1995 | Matsumoto | ................. | 718/104 |
| 5,506,987 A * | 4/1996 | Abramson et al. | .......... | 718/103 |
| 5,701,482 A * | 12/1997 | Harrison et al. | ............. | 718/105 |
| 5,784,697 A * | 7/1998 | Funk et al. | ................... | 711/170 |
| 5,826,081 A * | 10/1998 | Zolnowsky | ................. | 718/103 |
| 5,872,972 A * | 2/1999 | Boland et al. | ................ | 718/102 |
| 6,269,391 B1 * | 7/2001 | Gillespie | ..................... | 718/100 |
| 6,289,369 B1 * | 9/2001 | Sundaresan | ................. | 718/103 |
| 6,374,331 B1 | 4/2002 | Janakiraman | | |
| 6,385,659 B1 | 5/2002 | Tuel | | |
| 6,412,018 B1 | 6/2002 | Tuel | | |
| 6,415,332 B1 | 7/2002 | Tuel | | |
| 6,658,538 B2 | 12/2003 | Arimilli | | |
| 6,687,903 B1 * | 2/2004 | Chalmer et al. | ............. | 718/100 |
| 6,728,959 B1 * | 4/2004 | Merkey | ....................... | 718/102 |
| 6,728,962 B1 * | 4/2004 | Chalmer et al. | ............. | 718/108 |
| 6,754,782 B2 | 6/2004 | Arimilli | | |
| 6,766,424 B1 | 7/2004 | Wilson | | |
| 6,769,017 B1 | 7/2004 | Bhat | | |
| 6,779,182 B1 * | 8/2004 | Zolnowsky | .................. | 718/103 |
| 6,782,537 B1 | 8/2004 | Blackmore | | |
| 6,785,888 B1 | 8/2004 | McKenny | | |
| 6,842,857 B2 | 1/2005 | Lee | | |
| 6,865,585 B1 * | 3/2005 | Dussud | ....................... | 707/206 |
| 6,892,280 B2 | 5/2005 | Nakamura | | |
| 6,986,140 B2 * | 1/2006 | Brenner et al. | .............. | 718/105 |
| 7,287,254 B2 * | 10/2007 | Miller et al. | ................. | 718/102 |
| 7,296,271 B1 * | 11/2007 | Chalmer et al. | ............. | 718/108 |
| 2003/0177435 A1 * | 9/2003 | Budd et al. | .................. | 714/776 |
| 2004/0073907 A1 | 4/2004 | Noel | | |
| 2004/0225821 A1 | 11/2004 | Klein | | |
| 2005/0005067 A1 | 1/2005 | Culter | | |
| 2005/0015568 A1 | 1/2005 | Noel | | |
| 2005/0033948 A1 | 2/2005 | Wei | | |

* cited by examiner

*Primary Examiner*—Meng-Ai An
*Assistant Examiner*—Blake Kumabe

(57) ABSTRACT

To assign a plurality of processes to a plurality of processors in a multi-processor computer system, a plurality of processes are attached to a memory segment shared between a plurality of processors. A spin cycle is initiated in the plurality of processes, where initiating the spin cycle causes a processor-intensive operation to be performed by each of the processes, and wherein performing the processor-intensive operation by the processes induces rescheduling to be performed. As part of the rescheduling, one or more of the processes are reassigned among the processors during the spin cycle.

29 Claims, 3 Drawing Sheets

PROCESSOR ASSIGNMENT IN MULTI-PROCESSOR SYSTEMS

TECHNICAL FIELD

This application relates to electronic computing and more particularly to processor affinity in multi-processor systems.

BACKGROUND

High performance computer systems may utilize multiple processors to increase processing power. Processing workloads may be divided and distributed among the processors, thereby reducing execution time and increasing performance. One architectural model for high performance multiple processor system is the cache coherent Non-Uniform Memory Access (ccNUMA) model. Under the ccNUMA model, system resources such as processors and random access memory may be segmented into groups referred to as Locality Domains, also referred to as "nodes" or "cells". Each node may comprise one or more processors and physical memory. A processor in a node may access the memory in its node, referred to as local memory, as well as memory in other nodes, referred to as remote memory.

In ccNUMA systems, there may be performance penalties for accessing the remote memory, and there may also be latencies associated with multiple programs or instruction streams attempting to simultaneously update the same memory locations. The latencies may derive from waiting for other programs or instruction streams to complete their updates or from the overhead associated with coherence protocols for the memory.

SUMMARY

In one embodiment, a method of assigning a plurality of processes to a plurality of processors in a multi-processor computer system comprises attaching a plurality of processes to a memory segment shared between a plurality of processors, initiating a spin cycle in the plurality of processes, and assigning one or more of the processes to a processor or locality domain during the spin cycle.

DETAILED DESCRIPTION

Described herein are exemplary systems and methods for processor affinity in ccNUMA systems. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
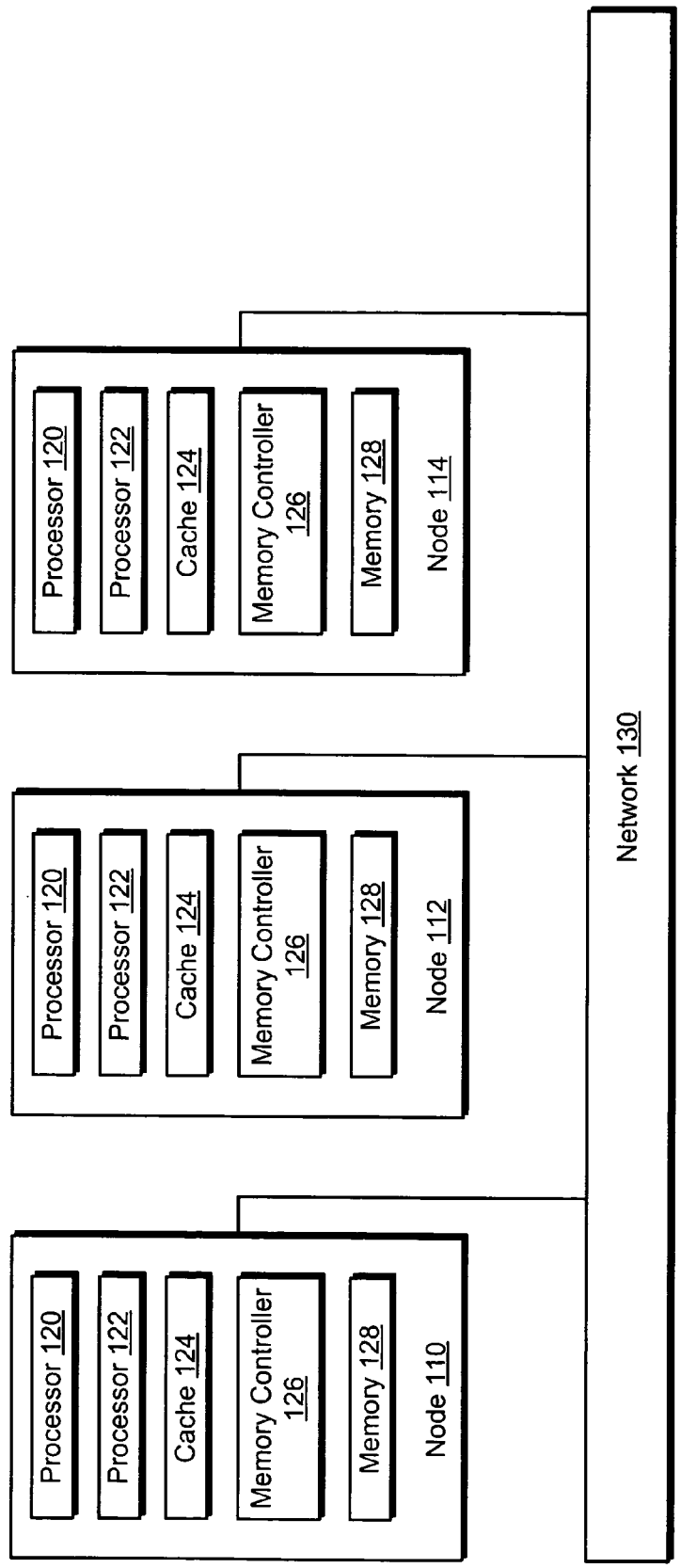
FIG. 1 is a schematic illustration of one embodiment of a ccNUMA computing system.

FIG. 1 is a schematic illustration of one embodiment of a multi-processor computing system 100. In one embodiment, computer system 100 may be implemented as a cache-coherent non-uniform memory access (ccNUMA) computing system.

Referring to FIG. 1, in one embodiment computer system 100 comprises three compute nodes 110, 112, 114 coupled to a communication network 130. Communication network 130 may be implemented using any suitable electronic communication protocol such as, for example, a PCI bus, PCI Express bus, an Inter-Integrated Circuit (12C) bus, a switching network such as a crossbar switch, a local area network (LAN), or other communication network.

Each compute node 110, 112, 114 may include multiple processors 120, 122, cache memory 124, a memory module 128, and a memory controller 126. Processors 120, 122 may be implemented as conventional central processing units (CPUs). Memory controller 126 controls cache memory 124 and memory 128.

Processes executing on the processor(s) 120, 122 in any computing node 110, 112, 114 may utilize cache memory 124 and memory 128 local to the computing node. In addition, processes executing on the processor(s) 120, 122 in any computing node 110, 112, 114 may access memory 128 from any adjacent computing node. For example, a process executing on processor 120 in computing node 110 may access memory 128 in either computing node 112 or 114 via communication network 130.

In one embodiment, computer system 100 may be coupled to one or more display devices such as, for example, a cathode ray tube (CRT) display or a liquid crystal display (LCD). Further, computer system 100 may couple to one or more input devices such as, for example, a keyboard and/or a mouse. Computer system 100 may be implemented as a server device or as one or more blades in a blade server. Computer system 100 may comprise one or more network interface cards (NICs) to permit the computing system 100 to couple to other network devices such as, for example, other computers, switches, and routers. Computer system 100 may further comprise one or more storage devices such as hard disk drives or removable media such as CD-ROMs. Such storage devices and the memories 124 and 128 are examples of computer-readable media.

In one embodiment, computer system 100 may be adapted to implement Message Passing Interface (MPI) standards to permit low latency and high bandwidth point-to-point and collective communication routines. MPI enables applications written using MPI specific code executing on one or many computer systems to take advantage of the network for inter-process communications. Computer system 100 may further include an operating system such as, for example UNIX®, LINUX®, or a WINDOWS® brand operating system.

In one embodiment, computer system 100 may include a shared library that interacts with the operating system and an application to facilitate assignment of processes of the application to one or more processors in the computing system 100. The shared library may be implemented as a set of logic instructions stored on a computer-readable medium which may be called by the operating system during process start-up operations. Details of the operation of the shared library are described below.

Figure 2:
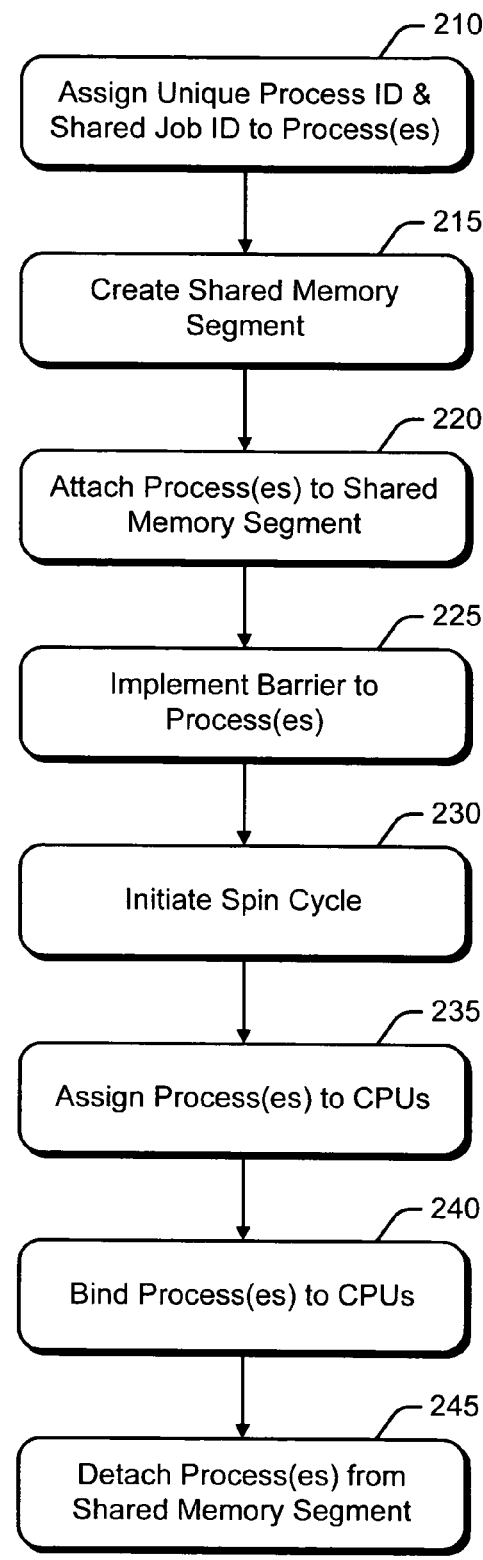
FIG. 2 is a flowchart illustrating operations in one embodiment of a method to implement process scheduling for memory affinity in a ccNUMA computer system.

FIG. 2 is a flowchart illustrating operations in one embodiment of a method to implement memory affinity in a multi-processor system. In one embodiment, the operations illustrated in FIG. 2 may reside in a shared library and may be invoked when certain new application processes are initiated by the operating system. In alternate embodiments, the operations illustrated in FIG. 2 may be invoked on an explicit or manual basis.

In one embodiment, the operations of FIG. 2 may be performed for one or more applications executing on computer system 100. Referring to FIG. 2, at operation 210 a unique process ID and shared job ID is assigned to each process associated with one or more applications. In one embodiment, the unique process ID and shared job ID may be implemented as a suitable numeric value. At operation 215 a shared memory segment is created. In one embodiment, the shared memory segment may be implemented in one of the memory modules 128.

At operation 220 the process(es) are attached to the shared memory segment created in operation 215. In one embodiment, previous process to CPU affinity methods that may have been implemented are severed.

At operation 225 a barrier is implemented in all of the processes associated with an application, and at operation 230 all of the processes associated with an application implement a spin cycle. In one embodiment, a spin cycle may be implemented as set of logic instructions that consume significant processing resources. As used herein, the phrase "significant processing resources" may be construed to any process that may require the operating system to be implicitly induced to perform a rescheduling operation. Hence, one goal of the spin cycle is to cause utilization of the CPUs on which the processes are executing to approach 100%. For example, a spin cycle may be implemented as a loop that increments a counter, or a loop that increments until the counter hits a large number (e.g., 1,000,000). In one embodiment the spin cycle may continue for a predetermined period of time, e.g., five to ten seconds, which may correspond to the time required for the operating system to perform a rescheduling operation induced by the spin cycle. The particular processor-intensive operation implemented by the spin cycle is not important. Alternate implementations of a spin cycle may include any other processor-intensive operation(s) such as, e.g., mathematical computations.

In one embodiment the task of assigning processes to processors or locality domains may be performed by the operating system. In assigning processes to processors, the operating system may determine a load parameter for the processors on the computing system. The operating system may assign processes to less-busy processors before assigning processes to more busy processors. In one embodiment the operating system assigns processes to processors beginning with the least busy processor and then to successively less-busy processors. Once the processes are assigned to processors in the computer system 100, the processes may be bound to the processors to which they are assigned and the processes may be permitted to continue to execute.

Immediately after the spin cycle, processes are assigned to one or more processors 120, 122 in the computing system (operation 235). The spin cycle may be maintained for a period of time that is predetermined and static, or may be set dynamically.

In one embodiment, at operation 240 the processes may optionally be bound to the node that contains the processor to which they are assigned following completion of operation 235. For example, referring to FIG. 1, a process may be bound to node 110, 112 or 114. Binding the process to the node, rather than directly to the processor, permits the process to be switched between processors on a single node, but maintains memory affinity between a process and local memory. In an alternate embodiment, the processes may be bound directly to specific processors. Following the spin cycle and any processor or node reassignment, the processes are detached from the shared memory segment and the shared memory segment is destroyed (operation 245). Control for the processes may then be passed back to the operating system.

Figure 3:
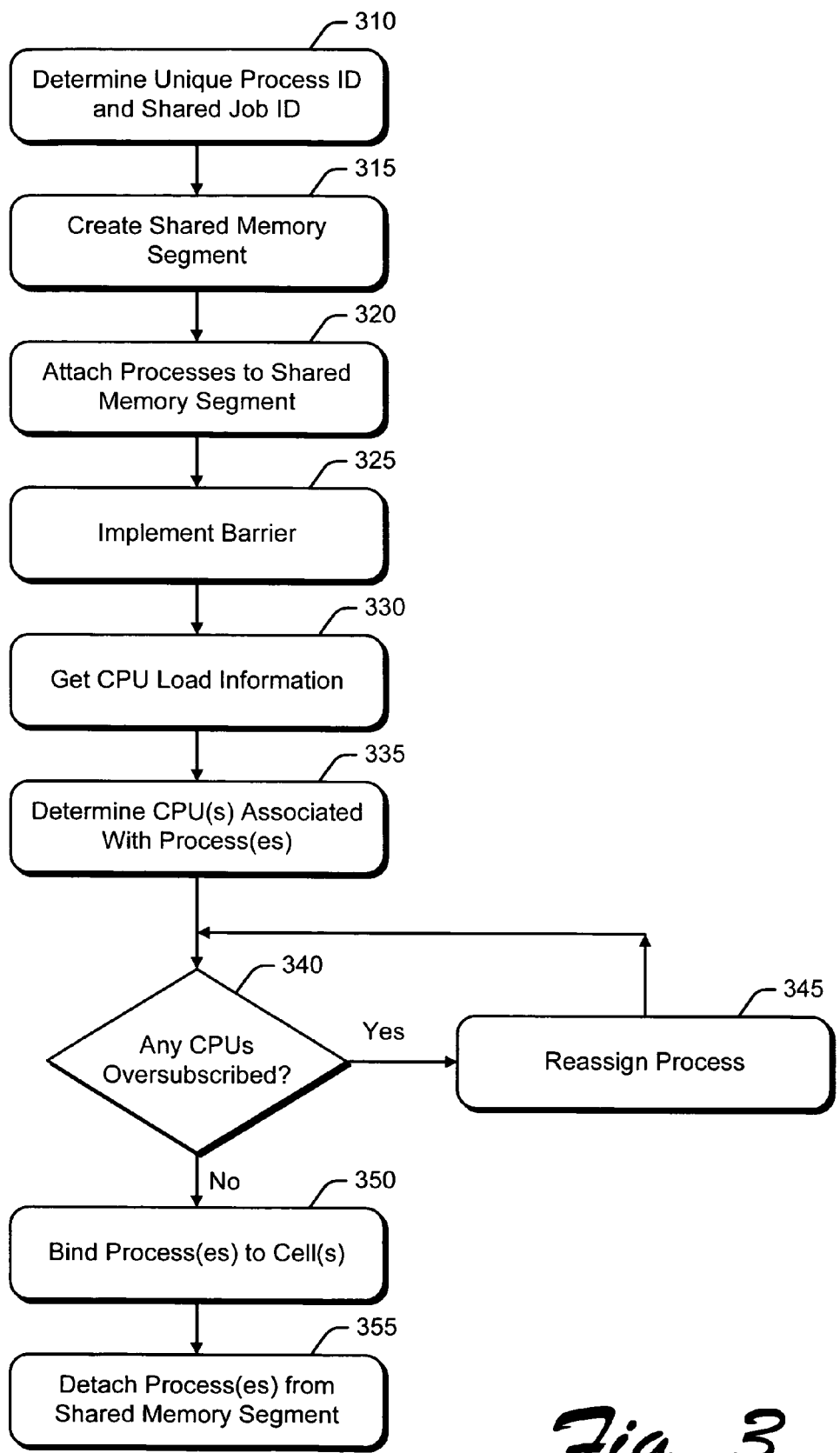
FIG. 3 is a flowchart illustrating operations in one embodiment of a method to alter any oversubscription of processes to processors or locality domains in a multi-processor computer system.

In one embodiment, the library may implement an oversubscription routine to reassign processes from one or more oversubscribed processors. An oversubscribed processor is one to which multiple processes are assigned. FIG. 3 is a flowchart illustrating operations in one embodiment of a method to alter any oversubscription of processes to processors in a multi-processor system. Referring to FIG. 3, at operation 310 a unique process ID and a shared job ID is assigned to each process. At operation 315, a shared memory segment is created and at operation 320 it is determined which processors (CPUs) and which processes are associated with. In one embodiment, the association is recorded in a suitable memory location such as, e.g., an array in memory.

At operation 325 a barrier is implemented to permit the affected processes to reach the same point in operation, and at operation 330 load information for the various processors (CPUs) to which the processes are bound is collected. In one embodiment the CPU load parameter corresponds to a measurement of the CPU load averaged over a time window. The time window may be fixed or variable. At operation 335 the CPUs associated with specific processes are determined.

If, at operation 340, any processors are oversubscribed, then control passes to operation 345 and the all except one process that was assigned to the processor is reassigned to different processors. Operations 340-345 may be repeated until no CPUs are oversubscribed. In one embodiment, a CPU is considered oversubscribed if the load parameter associated with the CPU exceeds a threshold. The threshold may be fixed or static. For example, if the CPU load exceeds a 90% utilization rate, then the processor may be considered oversubscribed. In an alternate embodiment, a processor may be considered oversubscribed if the number of processes assigned to the processor exceeds a threshold. The threshold may be fixed or static.

In one embodiment, at operation 350 the processes are bound to the node that contains the processor to which they are assigned following completion of operations 325-330. For example, referring to FIG. 1, a process may be bound to node 110, 112 or 114. Binding the process to the node, rather than directly to the processor, permits the process to be switched between processors on a single node by the Operating System, but maintains memory affinity between the process and local memory. In an alternate embodiment, the processes may be bound directly to specific processors.

At operation 355 the processes are detached from the shared memory segment to which they were attached in operation 320 and the shared memory segment is destroyed. Control for the processes may then be passed back to the operating system.

Embodiments described herein may be implemented as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A method of assigning a plurality of processes to a plurality of processors in a multi-processor computer system, comprising:
    attaching, in the computer system, the plurality of processes to a memory segment shared between the plurality of processors;
    initiating, in the computer system, a spin cycle in the plurality of processes, wherein initiating the spin cycle causes a processor-intensive operation to be performed by each of the processes, wherein the spin cycle implements the processor-intensive operation that consumes significant processor resources that causes utilization of the processors to approach 100%, and wherein performing the processor-intensive operation by the processes induces rescheduling to be performed; and
    as part of the rescheduling, reassigning, in the computer system, one or more of the processes among the plurality of processors during the spin cycle.

2. The method of claim 1, wherein attaching the plurality of processes to the shared memory segment comprises creating the shared memory segment for the plurality of processes.

3. The method of claim 2, further comprising implementing a barrier to the processes before initiating the spin cycle.

4. The method of claim 1, further comprising binding the processes to the processors to which the processes are assigned or to corresponding nodes containing the processors to which the processes are assigned.

5. The method of claim 4, further comprising running an oversubscription routine to reassign processes from one or more oversubscribed processors.

6. The method of claim 5, wherein running the oversubscription routine comprises:
    determining a processor load parameter for at least a particular one of the processors; and
    reassigning, to a second processor, a particular process previously assigned to the particular processor in response to determining that the processor load parameter exceeds a threshold.

7. The method of claim 6, wherein reassigning the particular process comprises reassigning the particular process to the second processor having a lower load parameter.

8. The method of claim 7, further comprising:
    determining a node associated with the second processor; and
    binding the particular process to the node.

9. The method of claim 1, wherein reassigning the one or more processes among the plurality of processors comprises reassigning the one or more processes to less busy processors before reassigning to more busy processors.

10. A computer system, comprising:
    a first computing node comprising at least one processor and a memory module coupled to the processor;
    a second computing node comprising at least one processor and a memory module coupled to the processor in the second computing node;
    a communication network coupled to the first computing node and the second computing node;
    wherein one or more of the processors in the first and second computing nodes are configured to:
        attach a plurality of processes to a memory segment shared between a plurality of the processors in the first and second computing nodes;
        initiate a spin cycle in the plurality of processes, wherein initiating the spin cycle causes a processor-intensive operation to be performed by each of the processes, wherein the spin cycle implements the processor-intensive operation that consumes significant processor resources that causes utilization of the processors to approach 100%, and wherein performing the processor-intensive operation by the processes induces rescheduling to be performed; and
        as part of the rescheduling, reassign one or more of the processes among the plurality of processors during the spin cycle.

11. The computer system of claim 10, wherein the shared memory segment is implemented in at least one of the memory modules.

12. The computer system of claim 10, wherein the one or more processors are configured to implement a barrier to the processes.

13. The computer system of claim 10, wherein the one or more processors are configured to bind the processes to the processors to which the processes are assigned.

14. The computer system of claim 10, further comprising an oversubscription routine executable to reassign processes from one or more oversubscribed processors.

15. The computer system of claim 14, wherein the oversubscription routine is executable to:
    determine whether a particular processor is oversubscribed by checking a processor load parameter for the particular processor; and
    in response to determining that the processor load parameter exceeds a threshold, reassign, to a second processor, a particular process previously assigned to the particular processor.

16. The computer system of claim 15, wherein reassigning the particular process comprises reassigning the particular process to the second processor having a lower load parameter.

17. The computer system of claim 16, wherein the one or more processors are configured to:
    determine a node associated with the second processor; and
    bind the particular process to the node.

18. The computer system of claim 10, wherein the one or more processors are configured to bind the processes to corresponding nodes containing the processors to which the processes are assigned.

19. The computer system of claim 10, wherein reassigning the one or more processes among the plurality of processors comprises reassigning the one or more processes to less busy processors before reassigning to more busy processors.

20. A computer program product comprising logic instructions stored on a computer-readable medium which, when executed by a computer system, assign a plurality of processes to a plurality of processors in the computer system by performing operations, comprising:
    attaching the plurality of processes to a memory segment shared between the plurality of processors;
    initiating a spin cycle in the plurality of processes, wherein initiating the spin cycle causes a processor-intensive operation to be performed by each of the processes, and wherein performing the processor-intensive operation by the processes induces rescheduling to be performed;

as part of the rescheduling, reassigning one or more of the processes among the plurality of processors during the spin cycle; and implement a barrier to the processes before initiating the spin cycle.

21. The computer program product of claim 20, further comprising logic instructions which, when executed by the computer system, configure the computer system to create a shared memory segment for the plurality of processes.

22. The computer program product of claim 20, further comprising logic instructions which, when executed by the computer system, configure the computer system to bind the processes to the processors to which the processes are assigned.

23. The computer program product of claim 20, further comprising logic instructions which, when executed by the computer system, configure the computer system to run an oversubscription routine to reassign processes from one or more oversubscribed processors.

24. The computer program product of claim 23, wherein running the oversubscription routine comprises:
   determining a processor load parameter for at least a particular one of the processors; and
   reassigning, to a second processor, a particular process previously assigned to the particular processor in response to determining that the processor load parameter exceeds a threshold.

25. The computer program product of claim 24, wherein reassigning the particular process comprises reassigning the particular process to the second processor having a lower load parameter.

26. The computer program product of claim 25, further comprising logic instructions which, when executed by the computer system, configure the computer system to:
   determine a node associated with the second processor; and
   bind the particular process to the node.

27. The computer program product of claim 20, further comprising logic instructions which, when executed by the computer system, configure the computer system to bind the processes to corresponding nodes containing the processors to which the processes are assigned.

28. The computer program product of claim 20, wherein the spin cycle implements the processor-intensive operation that consumes significant processor resources that cause utilization of the processors to approach 100%.

29. The computer program product of claim 20, wherein reassigning the one or more processes among the plurality of processors comprises reassigning the one or more processes to less busy processors before reassigning to more busy processors.

* * * * *